(12) United States Patent
Meyer et al.

(10) Patent No.: US 9,979,617 B1
(45) Date of Patent: May 22, 2018

(54) TECHNIQUES FOR CONTROLLING SCALING BEHAVIOR OF RESOURCES

(71) Applicant: Amazon Technologies, Inc., Reno, NV (US)

(72) Inventors: Timothy John Meyer, Oakton, VA (US); John Robert Stamper, Centreville, VA (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 14/278,597

(22) Filed: May 15, 2014

(51) Int. Cl.
*G06F 15/173* (2006.01)
*H04L 12/26* (2006.01)
*H04L 12/911* (2013.01)
*H04L 12/803* (2013.01)

(52) U.S. Cl.
CPC ............ *H04L 43/08* (2013.01); *H04L 47/125* (2013.01); *H04L 47/70* (2013.01)

(58) Field of Classification Search
CPC . H04L 47/22; H04L 67/1008; H04L 41/0896; H04L 47/70; H04L 47/125; G06F 9/5061; G06F 9/5083; G05B 11/011; G05B 19/056; G06Q 30/0601; H04N 7/165
USPC .................. 709/224, 226; 705/12; 707/705; 717/109; 718/1; 370/235
See application file for complete search history.

(56) References Cited

U.S. PATENT DOCUMENTS

| | | | | |
|---|---|---|---|---|
| 7,725,901 B2 * | 5/2010 | Gissel | ................... | G06F 9/5083 707/705 |
| 8,249,917 B1 * | 8/2012 | Kassmann | ......... | G06Q 30/0601 705/12 |
| 9,667,498 B2 * | 5/2017 | Wu | ...................... | H04L 41/0896 |
| 2003/0061362 A1 * | 3/2003 | Qiu | ......................... | H04N 7/165 709/229 |
| 2006/0236324 A1 * | 10/2006 | Gissel | ................... | G06F 9/5083 718/105 |
| 2008/0127065 A1 * | 5/2008 | Bryant | ................. | G05B 19/056 717/109 |
| 2010/0050171 A1 * | 2/2010 | Liang | .................... | G05B 11/011 718/1 |
| 2012/0173709 A1 * | 7/2012 | Li | ......................... | G06F 9/5061 709/224 |
| 2013/0097321 A1 * | 4/2013 | Tumbde | ............. | H04L 67/1008 709/226 |
| 2013/0107714 A1 * | 5/2013 | Liu | ........................ | H04L 47/22 370/235 |

(Continued)

OTHER PUBLICATIONS

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

(Continued)

*Primary Examiner* — Dustin Nguyen
(74) *Attorney, Agent, or Firm* — Davis Wright Tremaine LLP

(57) ABSTRACT

Current methods for providing automated scaling of network resources require tracking a specific metric and based on that metric exceeding a specified limit, provisioning additional resources. By providing additional control functionality for enabling customers to select parameters to use for automated resource scaling, customer systems can automatically and dynamically receive additional resources based on the selected parameters.

20 Claims, 8 Drawing Sheets

(56) References Cited

U.S. PATENT DOCUMENTS

2014/0129715 A1* 5/2014 Mortazavi ............ G06F 9/5083
709/226

OTHER PUBLICATIONS

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

* cited by examiner

TECHNIQUES FOR CONTROLLING SCALING BEHAVIOR OF RESOURCES

BACKGROUND

The use of network computing and storage has proliferated in recent years. The resources for network computing and storage are often provided by computing resource providers who leverage large-scale networks of computers, servers and storage drives to enable clients, including content providers, customers and the like, to host and execute a variety of applications and web services. The usage of network computing allows content providers and customers, among others, to efficiently and adaptively satisfy their computing needs. However, with the growing use of virtual resources, customers are encountering situations in which the virtual resources cannot accommodate their needs during certain situations, such as unanticipated traffic spikes or need for immediate responses to satisfy increased loads. In response to this, web resource service providers are introducing automated scaling.

Current methods in automated scaling of resources provide for rule-based or schedule-based auto-scaling mechanisms that require customer intervention and configuration of specific rules or times of day in order for the auto-scaling to be effectuated. In addition, current methods of automated scaling of resources can require several minutes for resources to become available, which is not suitable for time-sensitive applications or processes.

BRIEF DESCRIPTION OF THE DRAWINGS

Various embodiments in accordance with the present disclosure will be described with reference to the drawings, in which.

DETAILED DESCRIPTION

Figure 1:
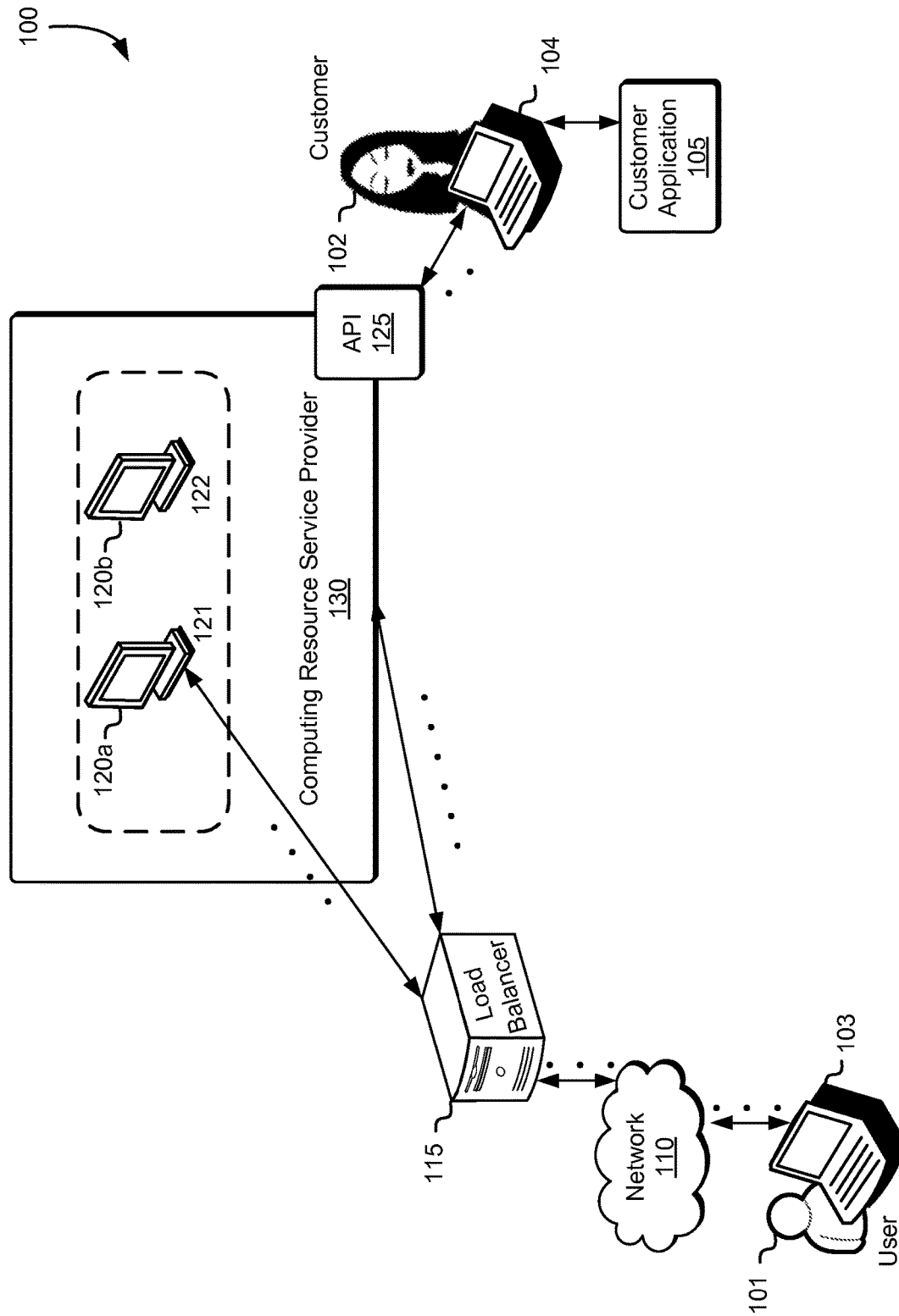
FIG. 1 illustrates an environment in which various embodiments may be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods and systems for dynamically scaling resources optimized according to customer-provided and/or system-determined parameters. Example embodiments further include methods and systems for automatically and dynamically managing a controller in order to manage computing resources or any resources that might be subject to demand fluctuation. Example embodiments include a scaling factor or determination that may be applied to a process in order to automatically and dynamically adjust and/or allocate resources in response to an event. For example, embodiments of a system are capable of reacting in response to an instantaneous change in network performance by employing a closed-loop or feedback control system where a current output is taken into consideration and changes are made based on feedback.

Example embodiments include controlling parameters configured to be weighted differently as variables of a system in order to provide feedback based at least in part on the weighting of the parameters. More specifically, example embodiments include controlling a computing resource in proportion to the current needs of a computing system by adjusting process control outputs to minimize disturbances or imbalances in the computing system.

For example, a computing resource may be adjusted based on the weighted-summation of three actions: determining a difference between a current load and a desired capacity, determining the accumulation of past load over an amount of time and determining the rate-of-change of a load over the amount of time. For example, a customer running an application on a web server for providing access to viral-video content may receive irregular traffic patterns or server load increases at random times or for random periods of time when a new viral-video is released. By employing a control-loop feedback systems according to example embodiments presented herein, the customer may tune parameters controlling the behavior of the control-loop feedback system once before the instances or events, and would not have to adjust the parameters again (unless the customer wanted to or if a significant change occurred in the design of the internal behavior of the customer's application).

A customer may choose from one or more of many server performance metrics or other metrics to be used as inputs for the control-loop feedback system; for example, inputs could include a percentage of disk space utilization, a percentage of CPU utilization, a percentage of memory utilization, network out utilization and other system metrics. For example, if the customer decides to select percentage of memory utilization as the input metric, the customer could provision the control-loop feedback system to track the input over a specified or randomized amount of time. The system would measure the difference between the current status and a desired status of the percentage of memory utilization, which is referred to as an "error." The system would further monitor the accumulation of past error over time for the percentage of memory utilization and a rate-of-change of the error over time (a prediction of future error based on the current rate-of-change) for the percentage of memory utilization.

A customer is further able to control a weighting or a setting of importance of each or any of the parameters. Based on the weighting applied to each one of the parameters, the controller may automatically and dynamically manage resources related to the percentage of memory utilization without further customer input. The customer may tune the three parameters to determine how much weight should be given to each one. For example, if a customer wants to provide a fast response to a request the customer may weigh the rate-of-change parameter more heavily such that when the system detects a fast rate-of-change, the system may provide a faster response.

Example embodiments include a mechanism for controlling an output of a computing resource or other resource at a set level even when external or internal processes may cause the output to vary and to provide mechanisms to dynamically and automatically change the resources in response to network conditions.

FIG. 1 is an illustrative example of a computing environment 100 in which various embodiments may be implemented. In the example embodiment of FIG. 1, the computing environment 100 includes a user 101 accessing a computing resource service provider 130 via a user device 103 and a customer 102 accessing the computing resource service provider 130 via a customer device 104. The user device 103 and the customer device 104 may be any type of device that is configured to request that a code be issued for a user and/or customer. Further, the devices may be configured to receive a system-generated or submit the code for validation. For example, the devices may be any type of consumer electronics device including a laptop or desktop computer, a tablet, a mobile phone or a smartphone, among others. The devices may be configured to communicate using any type of communication protocol including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

The user device 103 and/or customer device 104 may be equipped with a processor, such as a central processing unit (CPU) or a graphics processing unit (GPU) that provides computing functionality to a user. Furthermore, the user device 103 and/or customer device 104 may be configured with one or more applications that facilitate receiving voice inputs or voice commands from a user via the microphone or image inputs via a digital camera. The user device 103 and/or customer device 104 may further be equipped with a global positioning system (GPS) circuitry that enables locating the device. The user device 103 and/or customer device 104 may further be equipped with an operating system and may be configured to execute software applications and programs compatible with the operating systems.

Returning to the example embodiment of FIG. 1, the user 101 is a user of a customer application 105, which may be hosted by a web service such as the computing resource service provider 130 and operated by the customer 102. The customer 102 may use a computing resource service to host the application 105; for example, the application 105 may run on a virtual machine of a virtual system of the provider 130. The customer 102, via the customer device 104, may communicate with the computing resource service provider 130, or components thereof, via an application programming interface (API) 125. A virtual computer system service (not shown), which may be physical hardware, may be used by a computing resource service provider 130 for providing computation resources for customers. For example, customer 102 of the computing resource service provider may interact with the virtual computer systems service, via appropriately configured and authenticated API calls, to provision and operate virtual machine 120a instantiated on a system hardware (not shown) hosted and operated by the service provider 130. Example embodiments of the virtual machine 120a, instantiated via an active connection 121, may be used for various purposes, such as to operate as servers supporting a website, to operate business applications, or, generally, to serve as computing power for the customer. In alternative example embodiments, a customer application can run on multiple virtual instances or virtual resources, such as virtual machine 120b, which in the current example embodiment of FIG. 1 is not instantiated as indicated by the lack of solid connection 122, although it could be instantiated by the computing resource service provider 130 or component thereof, according to a predetermined logic, a dynamically determined logic or a request.

In example embodiments of FIG. 1, users of the customer's application may communicate with the computing resource service provider 130 through a network 110, whereby the network 110 may be a communication network, such the Internet, an intranet or an Internet service provider (ISP) network. Example embodiments further include the customer 102 communicating with the computing resource service provider through similar methods as the user 101. The user device 103 may further connect to the customer application via the network 110, which may be operably interconnected to a load balancer 115 or other proxy server configured to communicate with the computing resource service provider 130, the instantiated virtual machine 120a or other network components. The load balancer 115 may be a network-computing device configured to balance load among a set of computing resources, such as, for instance, by spreading web requests evenly among a cluster of web servers (not shown).

Further example embodiments of FIG. 1 include examples of a customer device 104 connected to a computing resource service provider 130 in accordance with at least one embodiment. The computing resource service provider 130 may provide a variety of services to the customer 102 and the customer device 104 may communicate with the computing resource service provider 130 via an interface, such as the API 125, which may be a web services interface or any other type of customer interface. The computing resource service provider 130 or a component thereof may be configured to receive instructions from the customer device 104 via the API 125, wherein the instructions may include specified parameters, metrics or other metadata related to the customer application.

In alternative example embodiments, the system may include a multi-tiered set of web front-end servers, such as one or more servers configured to process the web application and/or being operably interconnected to one or more databases serving resources for the web application. In some such example embodiments, the system may be configured to scale the web application front-end resources and/or application serving resources of one or more databases.

While FIG. 1 shows one interface for the services of the computing resource service provider 130, each service may have its own interface and, generally, subsets of the services may have corresponding interfaces in addition to or as an alternative to the interface 125. The customer 102 may be an organization that may utilize one or more of the services provided by the computing resource service provider 130 to maintain and deliver information to its employees, which may be located in various geographical locations. Additionally, the customer 102 may be an individual that utilizes the services of the computing resource service provider 130 to deliver content to a working group located remotely.

The computing resource service provider 130 may provide various computing resource services to its customers.

The services provided by the computing resource service provider 130, for example, may include a virtual computer system service, a block-level data storage service, a cryptography service, an on-demand data storage service, a notification service, an authentication system, a policy management service, a task service and one or more other services. It is noted that not all embodiments described above include the services described with reference to FIG. 1 and additional services may be provided in addition to or as an alternative to services explicitly described herein. As described herein, each of the services may include one or more web service interfaces that enable the customer 102 to submit appropriately configured API calls to the various services through web service requests. In addition, each of the services may include one or more service interfaces that enable the services to access each other (e.g., to enable a virtual computer system of the virtual computer system service to store data in or retrieve data from the on-demand data storage service and/or to access one or more block-level data storage devices provided by the block level data storage service).

Alternative example embodiments may include a virtual computer system service (not shown). The virtual computer system service may be a collection of computing resources configured to instantiate virtual machine instances on behalf of the customer 102. The customer 102 may interact with the virtual computer system service (via appropriately configured and authenticated API calls) to provision and operate virtual computer systems that are instantiated on physical computing devices hosted and operated by the computing resource service provider 130. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service is available, any other computer system or computer system service may be utilized in the computing resource service provider 130, such as a computer system or computer system service that does not employ virtualization or instantiation and instead provisions computing resources on dedicated or shared computers/servers and/or other physical devices.

In example embodiments, the computing resource service provider 130 additionally maintains one or more other services based at least in part on the needs of its customers. For instance, the computing resource service provider 130 may maintain a database service for its customers. A database service may be a collection of computing resources that collectively operate to run one or more databases for one or more customers. The customer 102 may operate and manage a database from the database service by utilizing appropriately configured API calls. This, in turn, may allow a customer 102 to maintain and potentially scale the operations in the database. Other services include, but are not limited to, object-level archival data storage services, services that manage and/or monitor other services and/or other services.

Example embodiments of a system for scaling resources may determine whether to scale a resource by submitting an application programming interface (API) call on behalf of a customer's account. As a result of an appropriate API request, a service provider will provision and/or de-provision virtual machines or other instances to fulfill the API call. Example embodiments of the provisioning process may include executing a provisioning workflow, which may include selecting a hardware device to provision the virtual machine, loading a machine image onto the selected hardware device, booting the virtual machine and/or configuring networking equipment to route network traffic to the Internet protocol (IP) address of the virtual machine.

Figure 2:
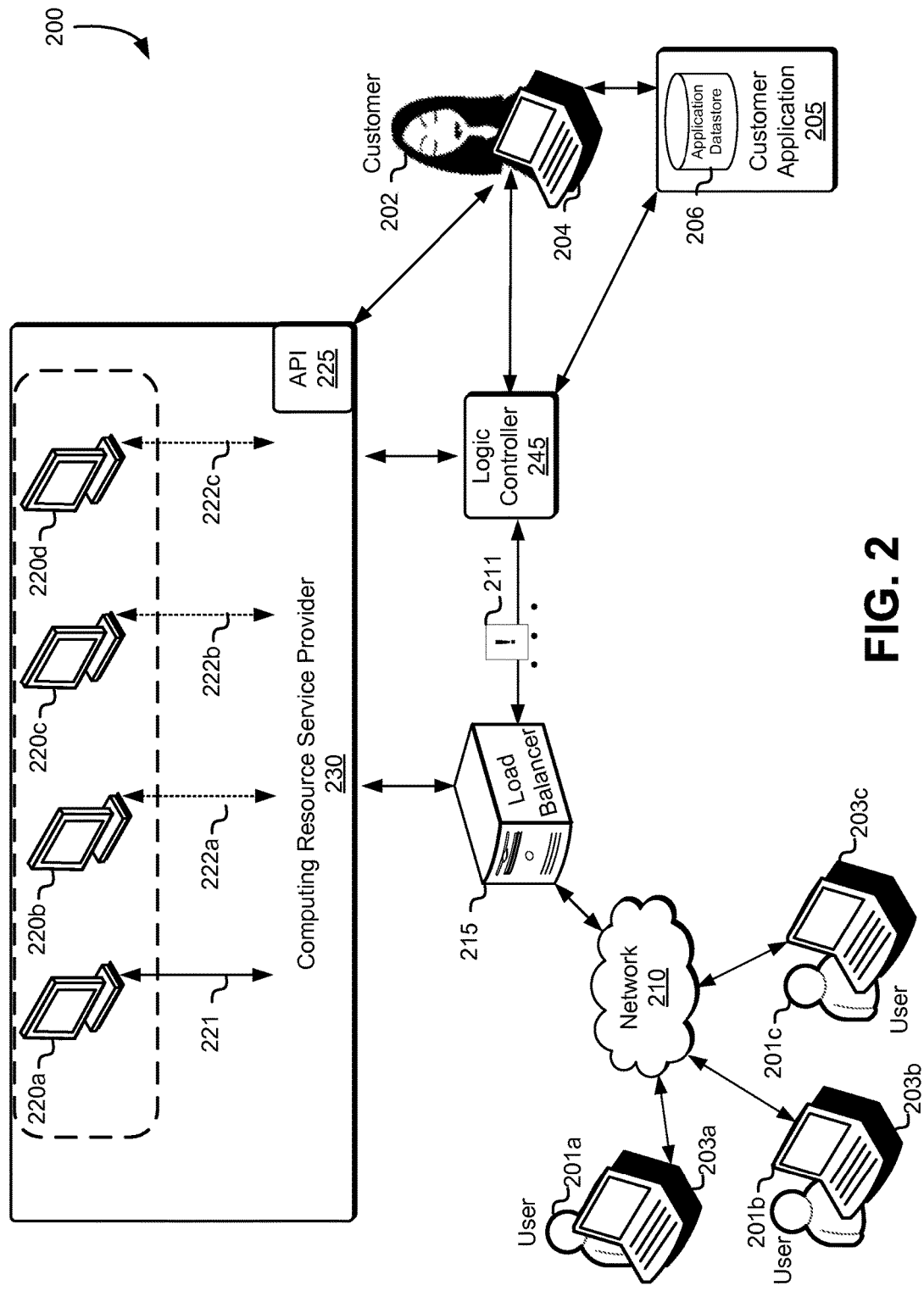
FIG. 2 illustrates an environment in which various embodiments may be implemented.

FIG. 2 is an illustrative example of a computing environment 200, which is similar to the computing environment 100 of FIG. 1, in which various embodiments may be implemented.

In the example embodiment of FIG. 2, the computing environment 200 illustrates three users, 201a-201c accessing a computing resource service provider 230 via three user devices 203a-c, respectively, and a customer 202 accessing the computing resource service provider 230 via a customer device 204. The user devices 203a-c and the customer device 204 may be any type of device that is configured to request that a code be issued for a user. Returning to the example embodiment of FIG. 2, the users being users of a customer application 205, which may be hosted by a web service, such as a web service provided by the computing resource service provider 230 and operated by the customer device 204.

The customer 202 may use a computing resource service to host the application 205; for example, the application 205 may run on a virtual machine of a virtual system and may be operably interconnected with an application data store 206. The customer 202, via the customer device 204, may communicate with the computing resource service provider 230, or components thereof, via an application programming interface (API) 225. For example, customer 202 of the computing resource service provider may interact with the virtual computer systems service, via appropriately configured and authenticated API calls, to provision and operate virtual machines 220a-220d instantiated on a system hardware (not shown) hosted and operated by a service provider. Example embodiments of the virtual machine 220a, instantiated via an active connection 221, may be used for various purposes, such as to operate as servers supporting a website, to operate business applications, or, generally, to serve as computing power for the customer. In alternative example embodiments, a customer application 205 may run on multiple virtual instances or virtual resources, such as virtual machines 220b-220d, which are not instantiated in the FIG. 2 as indicated by connections 222a-c, although they could be instantiated by the computing resource service provider 230, or component thereof, according to a predetermined logic, a dynamically determined logic or a request.

In example embodiments of FIG. 2, the user devices 203a-c may connect to the customer application 205 via the network 210, which may be operably interconnected to a load balancer 215 or other proxy server configured to communicate with the computing resource service provider 230, the instantiated virtual machine 220a or other network components. The computing resource service provider 230 may be configured to receive instructions from the customer device 204 via the API 225, wherein the instructions may include specified parameters, metrics or other metadata related to the customer application.

In an event where the actively instantiated virtual machine 220a is unable to handle an influx of traffic or load, the load balancer 215 may send a notification 211 to the logic controller 245 and/or the computing resource service provider 230, detailing the failure or burden on the network. According to some example embodiments presented herein, the logic controller 245 includes components configured to automatically and dynamically manage resources optimized according to customer-provided parameters. The customer-provided parameters may be stored in the logic controller, the application data store 205 of the customer application or other suitable data block. In an example embodiment, the logic controller 245, or an associated component thereof, may control a computing resource in proportion to the current needs of the computing environment 200 (see below for details). For example, the logic controller may determine that additional virtual machines must be instantiated in order to accommodate the load on the computer system coming from the influx of users 201a-c. As such, the logic controller 245, via the computing resource service provider 230 or other network component may cause the virtual machines 220b-d to be instantiated.

Figure 3:
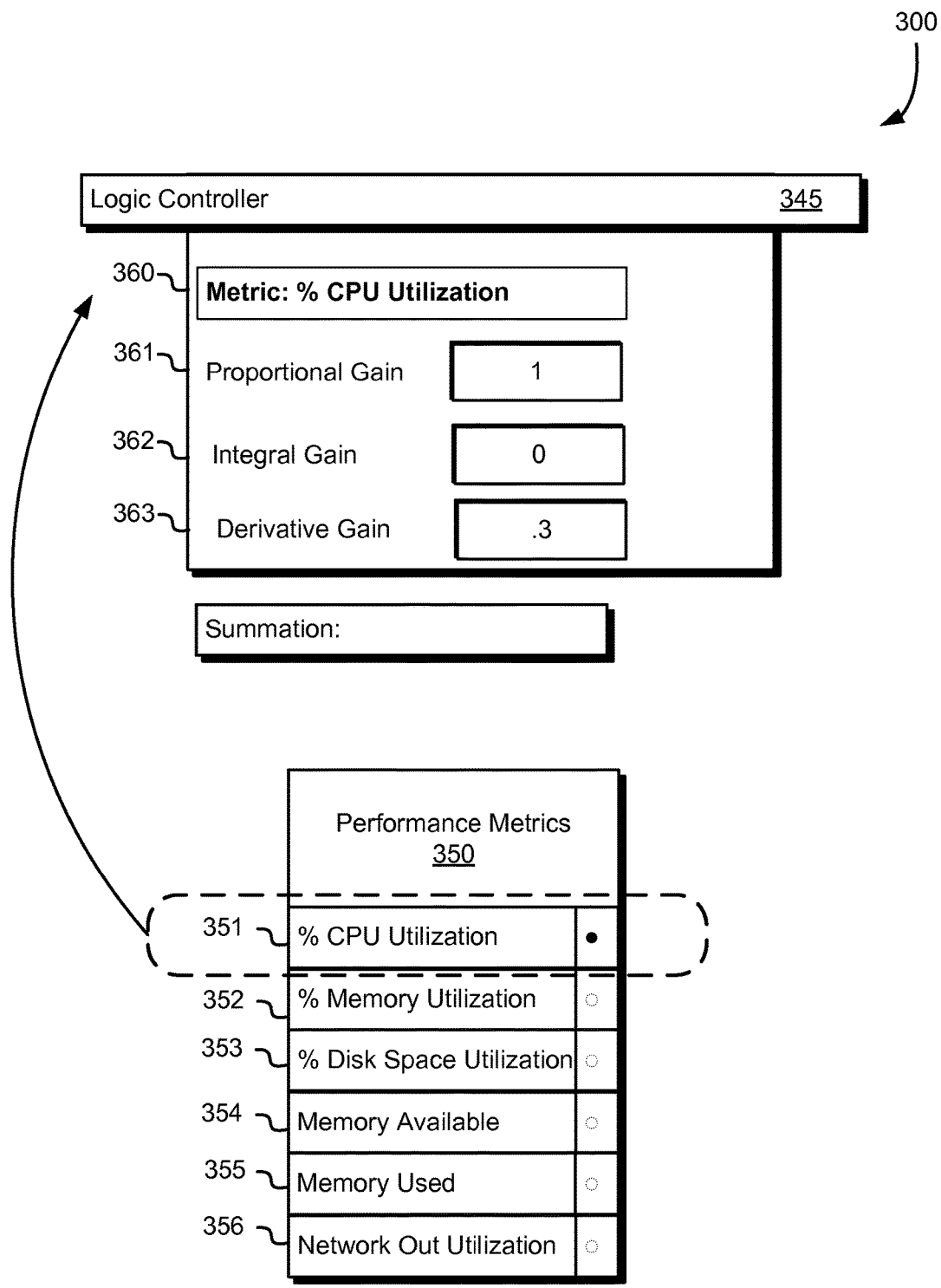
FIG. 3 is an illustrative example of a logic controller in accordance with at least one embodiment.

FIG. 3 illustrates a parameters-and-metrics control system 300 in accordance with example embodiments presented herein. The example embodiment includes a logic controller 345, which includes parameter information provided by a customer to provide customer-specific adjustments to the parameters. For example, a customer, such as the customer 102 as described and illustrated in FIG. 1, may determine a performance metric 350, such as percentage of central processing unit (CPU) utilization 351, percentage of memory utilization 352, percentage of disk space utilization 353, memory available 354, memory used 355, network out utilization 356 or other system, application or performance metrics.

In an example embodiment, when a customer selects a performance metric, such as percentage of CPU utilization 351, to be the metric for the logic controller parameters to measure, the customer can then provide a weight or influence to each of the three parameters of the logic controller 345. Specifically, the customer may choose proportional gain 361, integral gain 362 and derivative gain 363 based on the customer's preferences or the systems sensitivities. The gain of each parameter may include how much effect each parameter has on the output of the system.

Alternative example embodiments may include deriving a performance metric, such as the performance metrics 351-356, in order to monitor the performance metric. Alternative example embodiments may enable a customer or system to track and monitor multiple metrics and synthesize the input later. In alternative example embodiments, a customer or system may use a synthesized metric configured from various measured metrics and may divide or separate the individual metrics from the synthesized metric at a later time. Alternative embodiments still enable a customer to use an algorithm or program to create a grouped-metric, where the grouped-metric could be monitored. Further example embodiments may include scheduling an anticipated event in order to pre-warm the system or controller in order to deliver a more responsive action to users of the customer's application. Alternative example embodiments enable the logic controller or other system component to maintain or update the parameter specifications without specified instructions from the customer. For example, in a situation where a customer is using dynamic logical control automated scaling such as the embodiments presented herein, but has failed to update their parameter preferences after a customer application overhaul, the system, controller or component thereof may analyze past actual events of the customer application and choose parameter weightings that are similar to those chosen by the customer in the past or have been successful in the past for other customers operating similar applications.

Figure 4:
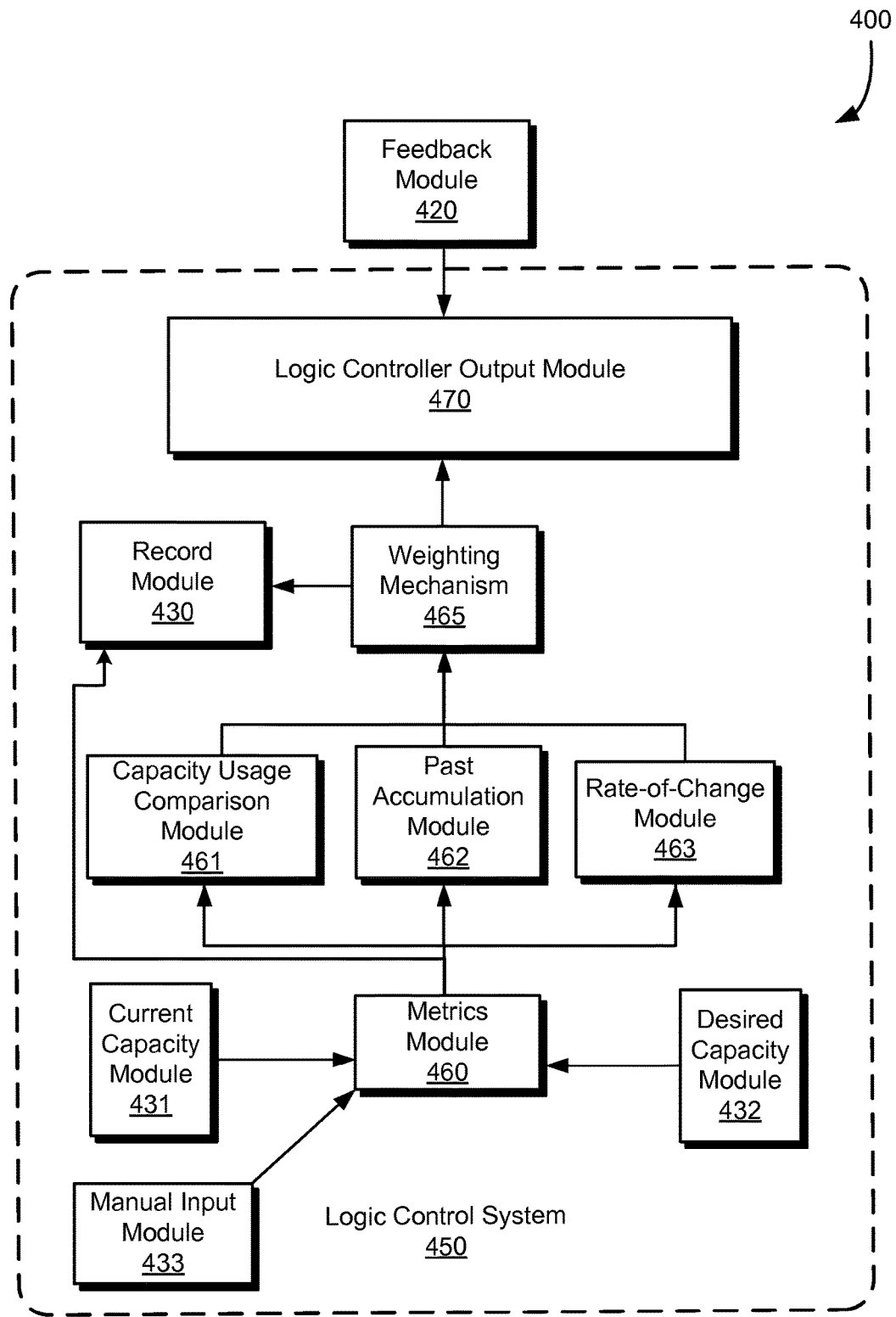
FIG. 4 is an illustrative example of a block diagram of a logic control system in accordance with at least one embodiment.

FIG. 4 illustrates an example of a control system 400 according to an example embodiment. The example embodiment includes a logic control system 450, which includes a current capacity module 431, metrics module 460, desired capacity module 432, manual input module 433, capacity usage comparison module 461, past accumulation module 462, rate-of-change module 463, weighting mechanism 465, record module 430 and logic controller output module 470 and is operably interconnected to a feedback module 420. Logic control system 450 includes modules illustrating one example of a flow of data through the system in which a customer, such as customer 202 described and illustrated in connection with FIG. 2, is able to select variables, weights and at least one metric to be dynamically and automatically controlled by a control system for provisioning computing resources in a computing network or computing system.

An example embodiment of the logic control system 450 may include a control function, controller or other component for providing a system configured, for example, to provide a wide range of operating conditions, including automatic tuning. An example embodiment of the logic control system may be any control system, such as a closed-loop or feedback control system. The logic control system could be a hardware device or any software program implemented in a hardware device. An example embodiment of a module may include, for example, a piece of hardware, a programming module with corresponding executable code, any software program implemented in hardware or any suitable computer device configured accordingly to have the capabilities described herein.

A logic controller, in some example embodiments being a portion of the logic control system, is configured to manage computing resources optimized according to customer-provided weightings for parameters of the control function. For example, the controller may be configured to determine the current capacity of a computing resource for the customer application according to the capacity module 431 and to determine or obtain the desired capacity information using the capacity module 432. In some example embodiments, a user may override the current capacity data from the capacity module 431 by entering input into the manual input module 433. For example, a user may pre-warm resources if the user had information that was anticipatory in nature, thereby enabling the user to adjust the resources available on either a scheduled or a manually driven basis in order to override the actual measured input for a period of time. For example, if a user has knowledge of a demand event or if the user anticipates a capacity-impacting event on the system, such as servicing the system, which may require additional resources or a change in resources that may be maintained manually in order to provide for the anticipated change in capacity. The override or manual input of capacity may be automatically time-bound by the system or may be bound according to user preferences or requirements. The desired and current capacity data is provided to a metrics module 460, which may include or be operably interconnected with a data store configured to store the desired performance metrics selected by the customer, such as the preference metrics described and illustrated in connection with FIG. 3. The metrics module may further contain weighting information selected by the customer regarding selecting influences for each parameter to be used on a per-metric basis.

Returning to the logical control system 450 in FIG. 4, the controller may be configured to obtain the applicable metric and parameter weightings associated with the selected metric. Alternative example embodiments of the metrics module 460 may include instruction to use multiple performance metrics in the same control-loop provided by the logic control system. The controller of the logic control system 450 is further configured to provide the current capacity, desired capacity, selected metric and/or weighting data to each of the capacity usage comparison module 461, the past accumulation module 462 and the rate-of-change module 463. The data or information may be provided at or around the same time to each of modules 461, 462 and 463 or at different times.

The capacity usage comparison module 461 includes a calculation module or process to calculate or determine the proportional function by comparing the current capacity and the desired capacity. The past accumulation module 462 may include a calculation module or process to determine the integral function of the accumulated past error over an amount of time. The rate-of-change module 463 may include at least a calculation module or process to determine the derivative function by calculating future error based on at least the current capacity and desired capacity over the amount of time.

In example embodiments, each of modules 461, 462 and 463 provide the calculated data to the weighting mechanism 465. In addition, the weighting mechanism 465 obtains the customer's weighting preferences from the modules 461, 462 and/or 463. In alternative example embodiments, the weighting mechanism receives the weighting preferences from the metrics module or obtains the preferences from another module or database. The weighting mechanism 465 includes a calculation module or process for calculating the weighted summation based on the calculated proportional, integral and derivative data of the metric in light of the customer's weighting preferences.

The weighting mechanism 465 is further configured to provide the weighted summation information to the logic controller output module 470, which is configured to process the information, determine if computing resources should be reassigned and, if computing resources are determined to be changed, the logic controller output 470 or a component operably interconnected therewith automatically provisions or instantiates additional resources for the customer's application. Alternative example embodiments include the logic controller output 470 determining to reduce computing resources and automatically reducing some or all of the resources associated with the customer application. In alternative example embodiments, the logic controller output 470 is further configured to receive or obtain feedback from a feedback module 420 that may be a component of the control-loop.

In alternative example embodiments, the logic controller may be configured to initiate changes or modifications to the resources without further customer input. For example, the logic controller may adaptively modify the resource allocations based on changes to the parameters or variables. In some example embodiments, the logic controller or other system component includes an adaptive intelligence that is configured to dynamically and/or automatically update parameters prior to or without additional changes to the resource allocations made by the customer. Further example embodiments include the logic controller or other system component operably interconnected thereto being configured to adjust or alter customer chosen parameters, parameter values or other variables when, for example, the customer-defined parameters are no longer valid based on changed system circumstances.

Alternative example embodiments of the logic control system 450 are further configured to determine and/or create a scaling factor to be applied automatically and dynamically to adjust, allocate and/or de-allocate resources in response to a network event or network activity, such as requests for increased bandwidth, fault-detections or network partitions. Examples of a network event can include an aggregation of occurrences of events that are measured and used to determine whether to scale resources. Example embodiments of the logic controller system 450 or components thereof are further configured to detect currently deployed and active computing resources, including recognizing state information related to each resource, such as performance metrics or additional available resources.

The control logic system 450 further includes a record module 430, which can receive, store and/or analyze data received from the weighting mechanism 465, feedback module 430 or other modules. In alternative example embodiments, fewer or greater modules may be part of or operably interconnected with the logic control system 450. Example embodiments of the control logic system can comprise multiple devices, for example, such as a fleet of redundant servers behind a load balancer.

Alternative example embodiments of FIG. 4 may include a computing resource service provider (not shown), such as the service provider 230 as described and illustrated in connection with FIG. 2, and may also include an account usage tracking module (not shown). The account usage-tracking module (not shown) may collect metrics or statistics on the usage of resources allocated to the customer. For example, the account usage-tracking module may collect metrics on the usage of the instantiated virtual machines provisioned to the customer and may make the metrics available to the customer. Further, the metrics collected by the account usage-tracking module may also be provided to an automatic scaling module (not shown) and may be used by the automatic scaling module to dynamically scale the resources allocated to the customer. Upon configuration, a resource, for example a virtual machine of a virtual computer system module (not shown), may be registered with the account usage-tracking module and may be instructed to provide usage statistics to the account usage-tracking module.

Figure 5:
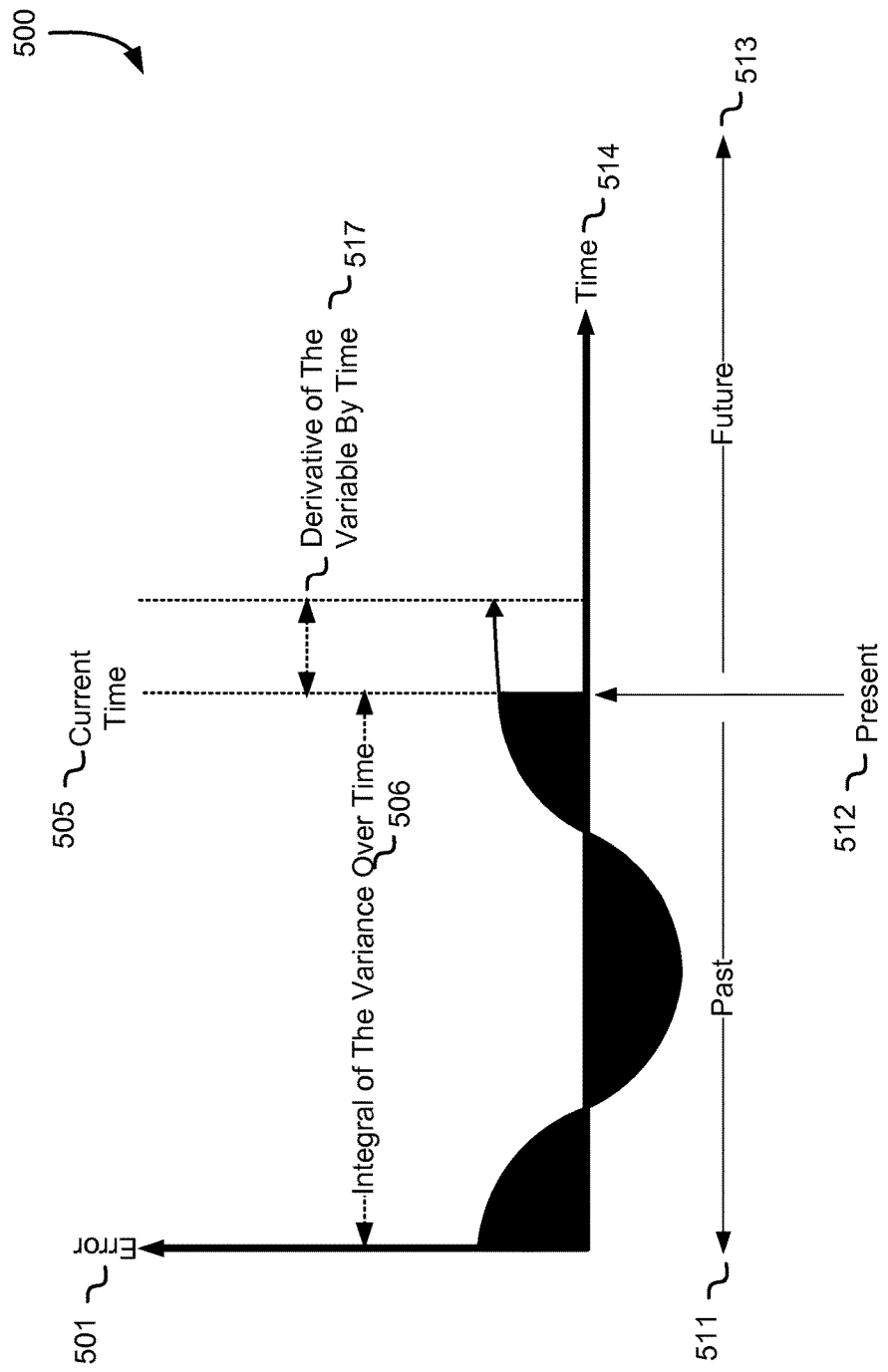
FIG. 5 is an illustrative example of a graph of error over time in a control system in accordance with at least one embodiment.

FIG. 5 is an illustration of a graph 500 plotting error 501 over time 514 showing the various parameters and variables of a proportional-integral-derivative (PID) control system and function for processes that perform control tasks. The graph 500 includes three measurements of time 514, including past time 511, present time 512 and future time 513, the various parameters are plotted according to the representative times. Example embodiments of the PID control system provide a method for controlling a resource, such as a computing resource in proportion to the current needs of the computing system. The PID control system, through a PID controller or logic controller, can dynamically and automatically compensate for deviations from a base line setting or discrepancies from an expected state of an application, network or resource. An example embodiment of the PID function includes three primary parameters and two primary variables, while additional or fewer parameters and variables may be used. Generally, a first variable includes a process value, which may be the current state of a process or application under the control of the PID control system. The process value, for example, could be the load on a server, which is a dynamic feature and susceptible to rapid and random change. The process value or values must be accurately and consistently measured in order for the logic controller to exact functions as best as possible.

The second variable is a set point variable that is used to signify a desired state of an application or process; for example, the set point variable would be the desired process output than the control system will aim to reach. Generally, the two variables, process value and set point, are used for determining an "error," where the error is calculated by determining the difference between the current state of an application or process and the desired state of the application or process. Example embodiments enable a customer to choose different sensitivities based on how the customer wants the system to perform a change to computing resources. In other words, in some example embodiments, the customer is able to control the amount of corrective action applied for an error.

Returning to the three primary parameters of the control function, the controller may adjust process control outputs in order to minimize error. The first process control output is a proportional parameter, which reflects the current position, such as the current time 505, or difference between the desired value and the current state. The second process control output is an integral parameter, the integral of the variance over time 506, which is measured according to the accumulation of past errors (the difference between the desired value and the actual value) over time. The third process control output is a derivative parameter, the derivative of the variable by time 517, which is the rate-of-change of the error (the difference between the desired value and the actual value) over time. The weighted summation of these three parameters is used to adjust the computing resources available to a computing system. It will be understood by those of ordinary skill in the art that the order of the process control outputs provided in the example embodiments of FIG. 5 are merely exemplary, alternative orders or possible future parameters are encompassed in accordance with example embodiments presented herein.

A PID control system, according to some example embodiments presented herein, enables a customer to control parameters configured to weight different variables of a system in order to provide feedback based on the weighted summation of the parameters. By placing additional emphasis on one of the three parameters, the proportion, the integral or the derivative, different feedback will be provided, where the feedback can be used to change the resources available to a computing device. For example, a customer application hosted on a web service may experience irregular traffic patterns, server load increase, external variables or unforeseen, unpredicted dynamic factors affecting the application, such that computing resources may need to be dynamically and automatically adjusted. Example embodiments enable a customer to choose parameters such that a current output of a system is considered and corrections are made based on feedback provided by the control system, such as a closed-loop control system employing a control-loop feedback mechanism. Alternative example embodiments may use an open-loop control system.

In the example of a customer requiring a change in computing resources in order to accommodate fluctuations on the network, the customer may place more emphasis on different parameters when initializing or updating the PID control system in order to have a system that reacts instantaneously or near-instantaneously and dynamically in response to the fluctuations. For example, if a customer wants to maintain a fast response to users accessing the application, the customer can weigh the derivative parameter more heavily, so when a fast rate-of-change is identified, the system provides a fast response. In other words, when a rapidly changing error is detected, the controller or other system component generates a large resource adjustment. In another example, when a proportional action is weighted, if a small error is identified, the controller will yield a small resource adjustment, whereas, if the controller identifies a large error, a large resource change is enacted.

Further examples include, when an integral action is taken, and a small error is identified that has existed for a long period of time, the controller or other network component will generate a large resource adjustment. Alternative example embodiments disclose that configuring, tuning or weighting at least one or more of the three parameters, the logic controller is configured to provide control actions designed for specific process requirements, such as providing additional servers or caches. Example embodiments of the logic controller can further be configured to continuously, periodically or aperiodically receive feedback related to the provided control actions, where the feedback can include additional information, such as information related to overshooting, dampening, oscillating and the like. Alternative example embodiments allow for variations of the logic controller, such as where the derivative action is turned off or only the integral action is turned on for a set of point changes.

Figure 6:
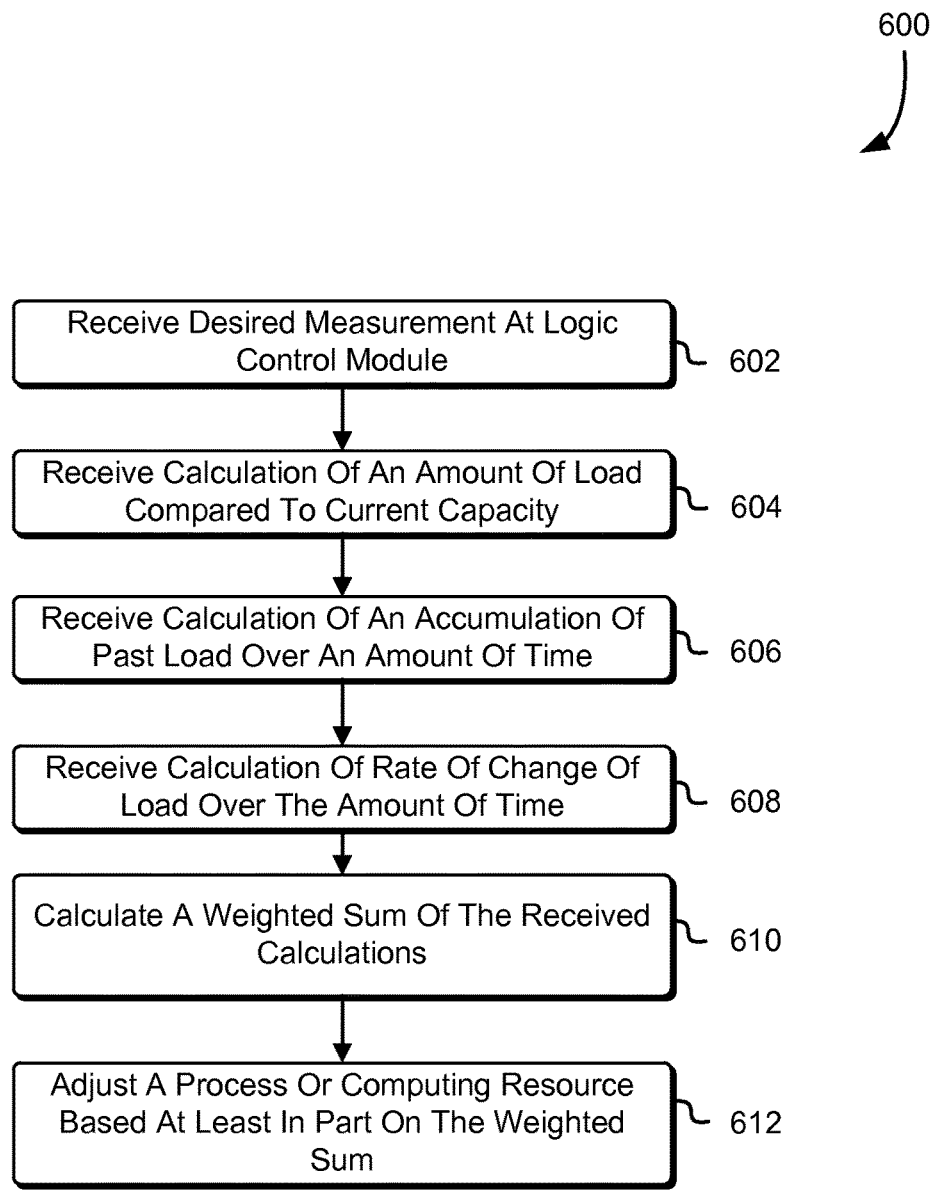
FIG. 6 is an illustrative example of a process for adjusting computing resources in accordance with at least one embodiment.

FIG. 6 is a block diagram illustrating a process 600 for adjusting a computing resource based on a summation of calculated components in accordance with an example embodiment presented herein. The process 600 may be performed by any suitable system, such as by the logic controller 245 as described and illustrated in connection with FIG. 2 and/or any suitable system or component thereof. Returning to FIG. 6, according to the process 600, a logic controller receives a desired measurement or set point (602), where the desired measurement can be a desired state of an application running on a virtual machine, including computing resources. The logic controller may be further configured to receive a calculation of an amount of load compared to a current capacity (604). For example, the logic controller may receive a proportional value of the difference between the current state and the desired state of the computing system. Returning to the process 600, the logic controller may receive a calculation of an accumulation of past load over an amount of time (606). For example, the controller would receive the accumulation of past differences between the desired value and the current state over an amount of time.

The logic controller further receives a calculation of a rate-of-change of a load over the amount of time (608). For example, the controller may receive a derivative function relating to the future possible error for a determined amount of time. Returning to the process 600, in response to receiving the three calculations, the logic controller is configured to calculate a weighted summation of the received calculations (610). For example, the weighted summation may include, alternatively being an average or other function, giving more influence to some parameters over other parameters in the same set of parameters. For example, referring to the logic controller 345 as described and illustrated in connection with FIG. 3, the proportional gain value 361 is given more weight or influence than the integral gain and derivative gain for the control function for the selected metric. Returning to FIG. 6, the process 600 continues by the logic controller adjusting a computing resource based at least in part on the weighted summation of the three calculated parameters (612).

It will be understood by those of ordinary skill in the art that the order of the comparisons and calculations provided in the example embodiments of FIG. 6 are merely exemplary, alternative orders or possible future parameters are encompassed in accordance with example embodiments presented herein. For example, calculation can be received in any order, or even wholly or partially in parallel.

Figure 7:
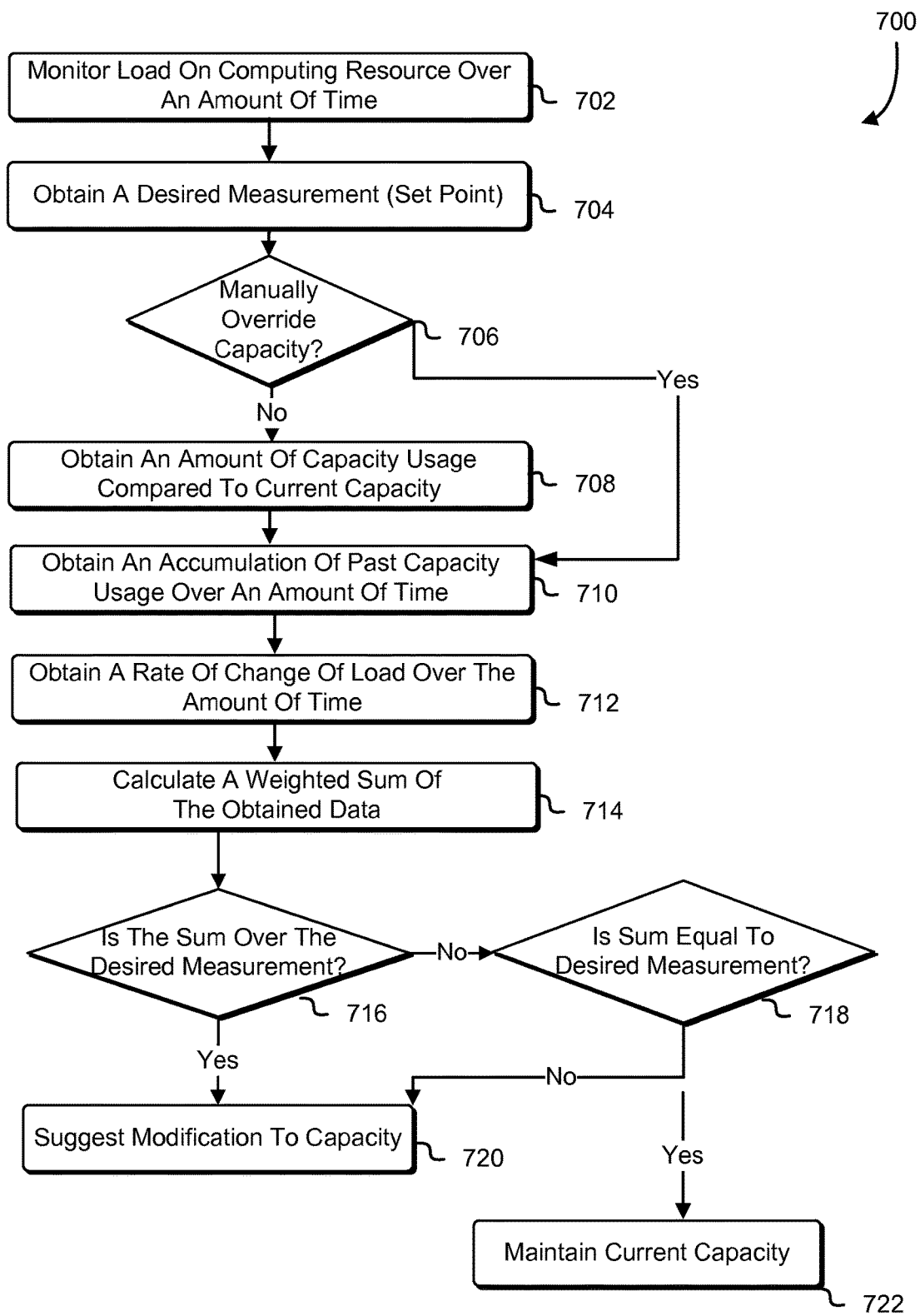
FIG. 7 is an illustrative example of a process for suggesting modification to capacity of a resource in accordance with at least one embodiment.

FIG. 7 is a block diagram illustrating a process 700 for suggesting a modification to a current capacity in accordance with an example embodiment presented herein. The process 700 may be performed by any suitable system, such as by the logic controller 245 as described and illustrated in connection with FIG. 2 and/or any suitable system or component thereof. Returning to FIG. 7, the process 700 includes a controller monitoring a load or capacity of a computing resource for a specified amount of time (702). The specified amount of time could be a predetermined period of time or an amount of time selected by a customer of the system. The controller may further obtain a desired measurement or set point (704) and determine if the user would manually override the capacity (706), such as providing the system owner or user to override the desired measurement based on, for example, a time window or an anticipation of an unmeasured requirement for capacity. The controller may further obtain an amount of load or capacity usage compared to a current capacity (708), an accumulation of past capacity usage over an amount of time (710) and a rate-of-change of the load over the amount of time (712). The controller may be configured to calculate a weighted summation of the obtained data (714); alternatively, the controller may calculate an integral or average of the obtained data.

The process 700 continues with the controller being configured to determine if the summation of the obtained data is over or higher than the desired measurement (716). If the summation is higher than the desired measurement, the controller or a component or interface operably interconnected therewith may provide a calculated suggestion to the customer or system of the process, where the suggestion could be a generated message suggesting a modification to the current capacity in a manner that would compensate for any error (720). If the summation is not higher than the desired measurement, the controller or component thereof may determine if the summation is equal to the desired measurement (718). If the summation is equal to the desired measurement, then the suggestion from the controller based on the calculated evidence may suggest maintaining the current capacity (722). However, if the summation is not equal to the desired measurement, the controller may calculate a suggested modification to provide to a customer suggesting a change in the capacity (720).

Example embodiments may include suggesting modifications to the capacity, for example, a suggested modification could include a change to a different instance size (e.g., from small to large to very large) in order to meet a capacity requirement. Alternative suggested modifications could include the use of a difference procurement model (e.g., use of a fluctuating variable that changes based on availability or demand) in order to meet a capacity requirement or to allow an instance to run for a longer period than indicated in order to optimize spending (e.g., if an instance is purchased for one hour, the instance would run for the entire hour). For example, if a function indicates that an instance should be terminated, the instance may remain active when there is no cost savings for an early termination. In other words, an instance may be run as long as it will not incur further costs for running the instance. Alternative example embodiments cause the controller to adjust the resources automatically without consulting the customer.

Further example embodiments implement a form of hysteresis to avoid the need for constantly or periodically adding and subtracting one or more instances when a traffic load fluctuates between requiring an additional instance. For example, when the trigger points for launching and terminating an instance are a non-zero distance from each other, a new instance may be launched when x transactions per second (TPS), or other measure of load, but an instance will only be taken down when the rate falls to y TPS, where y is less than x. In such an embodiment, if the load fluctuates around x, instances will not be rapidly started and stopped.

Alternative example embodiments include a simulation of dynamic and automatic scaling of resources in accordance with example embodiments presented herein. For example, a first simulation may be based on actual historical data provided by a customer's existing applications or existing resources using the predictive dynamic automated scaling embodiments presented herein. A second example simulation may be based on fictional data or data provided by customers maintaining similar websites or general websites. These simulations may be provided to a customer in order to provide the customer with a method of exploring alternative parameter control and illustrating examples of how a system would behave differently if a different set or configuration of tuned parameters were used. For example, if a customer encountered a problem or bug in their application, a simulation could be selected by the customer, or simply provided to the customer, to suggest alternative ways to weigh the parameters in order to ensure the error will likely not occur again.

Alternative example embodiments could further provide a statistical analysis of the parameters and outcome of the customer's dynamic automated scaling system in place of or in combination with the simulations. Example embodiments may include a simulation that provides a state that is measured and the parameter that is controlled being provided to a customer along with timestamps. Such a simulation analysis provides the customer with a method of reviewing the metrics and parameters in light of specific points in time and take actions based on such reviews.

Further alternative example embodiments may include providing a customer with flexibility on when the customer can execute their application, the customer could bid on unused computing capacity that is available for short amounts of time for varying costs. In some example embodiments, the control logic can include providing a customer with an option to scale resources based at least in part on the economic costs. For example, a customer could require additional computing resources, such as a new instance, according to the dynamic automated scaling parameters; however, the customer may have a financial variable or parameter set such that some or all scaling decisions are first provided as an option to the customer in place of automatic configuration. For example, the option may include a price associated with the scalable resource or other relevant information.

Figure 8:
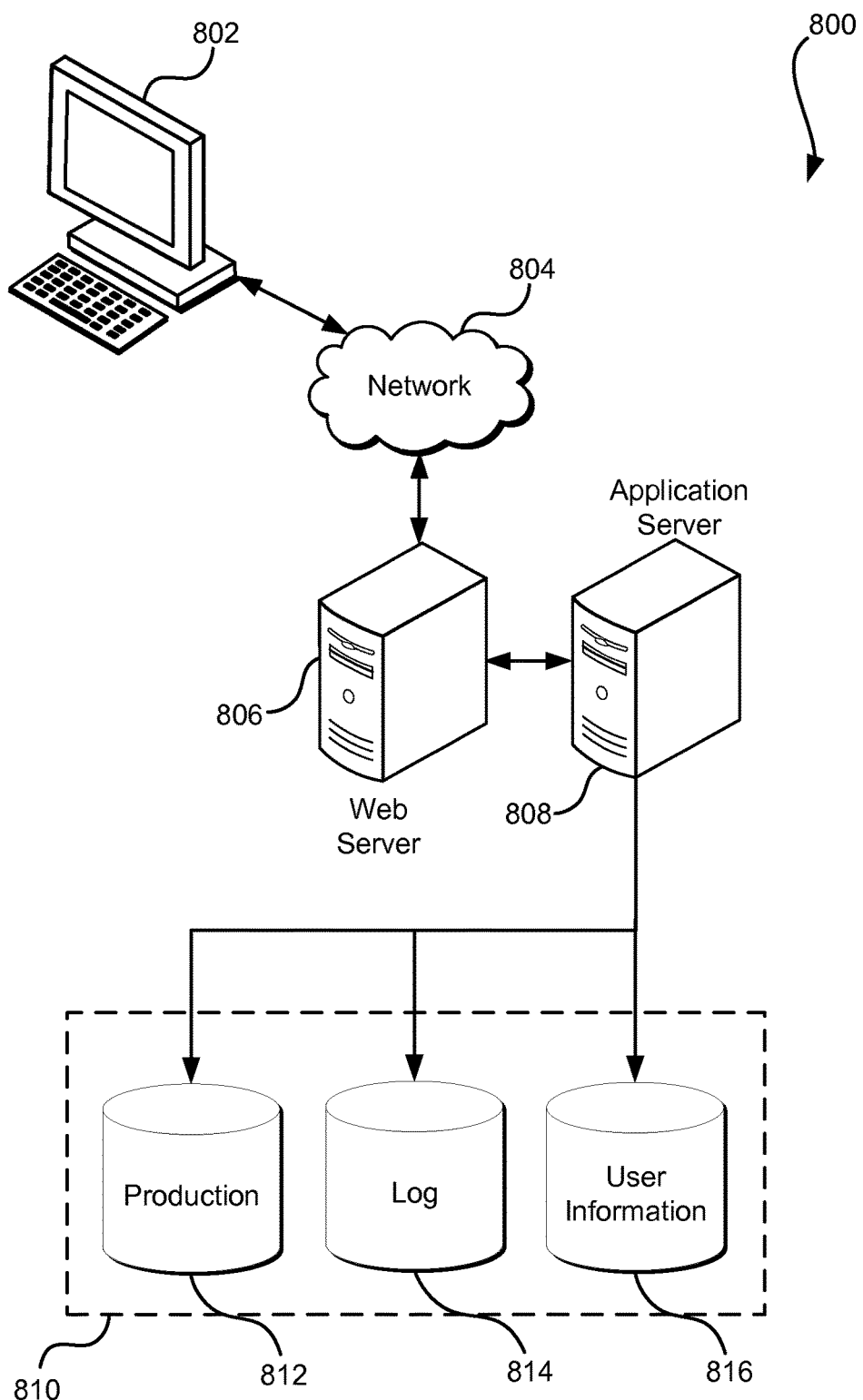
FIG. 8 illustrates an environment in which various embodiments may be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for providing resources, comprising:
   monitoring load on at least one cluster of computing devices over an amount of time, the at least one cluster of computing devices having a current capacity;
   calculating, based at least in part on the monitored load, an amount of load compared to the current capacity, an accumulation of past load over the amount of time, and a rate-of-change of load over the amount of time;
   generating, based at least in part on a summation of the calculated amount of load compared to the current capacity, the accumulation of past load over the amount of time, and the rate-of-change of load over the amount of time, a determination whether to modify the capacity of the at least one cluster of computing devices; and
   as a result of the generated determination being to modify the capacity of the at least one cluster of computing devices, transmitting one or more requests whose fulfillment results in the at least one cluster of computing devices changing in accordance with the generated determination.

2. The computer-implemented method of claim 1, further comprising provisioning additional computing resources as a result of the generated determination being to modify the capacity of the at least one cluster of computing devices.

3. The computer-implemented method of claim 2, wherein the additional computing resources include one or more webservers, caches, virtual machines, containers, or load balancers.

4. The computer-implemented method of claim 1, further comprising:
   detecting currently active computing resources, wherein the detecting further includes recognizing state information related to each of the detected currently active computing resources; and
   detecting currently inactive computing resources, wherein the detecting further includes determining if the inactive computing resources are available to be activated.

5. A system, comprising:
   at least one computing device configured to implement one or more services, wherein the one or more services:
      monitor capacity usage on a cluster of capacity-constrained systems over an amount of time, the cluster of capacity-constrained systems having a capacity;
      calculate, based at least in part on the monitored capacity usage, an amount of capacity usage relative to a current capacity, an accumulation of past capacity usage over the amount of time, and a rate-of-change of capacity usage over the amount of time; and
      change the capacity in accordance with a summation of the an amount of capacity usage relative to the current capacity, an accumulation of past capacity usage over the amount of time, and a rate-of-change of capacity usage over the amount of time.

6. The system of claim 5, wherein changing the capacity in accordance with the summation of the calculated amount of capacity usage relative to the current capacity, an accumulation of past capacity usage over the amount of time, and a rate-of-change of capacity usage over the amount of time includes changing a number of servers in the capacity-constrained system.

7. The system of claim 5, wherein the one or more services are further configured to obtain feedback related to the change of the capacity, wherein the feedback includes the amount of capacity usage relative to the current capacity, the accumulation of past capacity usage over the amount of time, and the rate-of-change of capacity usage over the amount of time received as feedback from a previous capacity change.

8. The system of claim 5, wherein the one or more services are further configured to run in a closed-loop control system.

9. The system of claim 5, wherein the one or more services are further configured to monitor at least one network activity, wherein the at least one network activity includes user requests for bandwidth, traffic state on a website, load state on a website, or load state at a load balancer.

10. The system of claim 5, wherein the one or more services are further configured to provide an application programming interface (API) for a customer to provide parameters, wherein the provided parameters are used to tune an algorithm used to calculate the amount of capacity usage relative to the current capacity, the accumulation of past capacity usage over the amount of time, and the rate-of-change of capacity usage over the amount of time.

11. The system of claim 10, wherein the one or more services are further configured to receive the parameters via the API, wherein the parameters are associated with the amount of capacity usage relative to the current capacity, the accumulation of past capacity usage over the amount of time, and the rate-of-change of capacity usage over the amount of time, wherein the parameters are constraints associated with each of the amount of capacity usage relative to the current capacity, the accumulation of past capacity usage over the amount of time, and the rate-of-change of capacity usage over the amount of time.

12. The system of claim 11, wherein the parameters are used to apply a level of significance to each of the amount of capacity usage relative to the current capacity, the accumulation of past capacity usage over the amount of time, and the rate-of-change of capacity usage over the amount of time, wherein the level of significance is a tunable variable.

13. A non-transitory computer-readable storage medium having stored thereon executable instructions that, as a result of execution by one or more processors of a computer system, cause the computer system to at least:
implement a logic controller configured to:
monitor utilization on a cluster of computing resources, the cluster of computing resources having a current capacity;
calculate, based at least in part on the monitored utilization, a summation of at least three parameters associated with the utilization;
analyze the calculated summation of at least three parameters associated with the utilization compared to the current capacity; and
adjust the current capacity based at least in part on an outcome of the analyzing of the summation of the calculated at least three parameters.

14. The non-transitory computer-readable storage medium of claim 13, wherein the instructions further comprise instructions that, when executed by the one or more processors, cause the computer system to provide an application programming interface (API) to a customer to tune at least one of the at least three parameters prior to the calculation.

15. The non-transitory computer-readable storage medium of claim 14, wherein the instructions further comprise instructions that, when executed by the one or more processors, cause the computer system to:
record an event on a customer application over a period of time; and
create a simulation based on the event using at least one of the at least three parameters tuned by the customer.

16. The non-transitory computer-readable storage medium of claim 15, wherein the instructions that cause the computer system to create the simulation based on at least one of the at least three parameters tuned by the customer further includes instructions that cause the computer system to:
create at least one second simulation using the at least one of the at least three parameters tuned by the customer in at least one alternative tuned parameter other than the tuned parameter from the customer;
provide the at least one second simulation to the customer; and
provide suggested tuning for at least one of the at least three parameters based at least in part on the at least one second simulation.

17. The non-transitory computer-readable storage medium of claim 13, wherein the instructions further comprise instructions that, when executed by the one or more processors, cause the computer system to configure the logic controller to receive capacity data after the adjustment in the current capacity occurs.

18. The non-transitory computer-readable storage medium of claim 17, wherein the instructions that cause the computer system to configure the logic controller to receive capacity data after the adjustment in the current capacity occurs further includes instructions that cause the computer system to:
evaluate the received capacity data according to the at least three parameters; and
use the evaluated capacity data to further adjust the current capacity of the cluster of the computing resources, when further adjustment is desired.

19. The non-transitory computer-readable storage medium of claim 13, wherein the instructions configure the logic controller to receive data from a customer application periodically or periodically.

20. The non-transitory computer-readable storage medium of claim 19, wherein the instructions that cause the computer system to configure the logic controller to receive data from a customer application periodically or periodically further includes instructions that cause the computer system to:
re-analyze the calculated at least three parameters associated with the utilization as compared to the current capacity; and
re-adjust the current capacity based on the re-analyzed calculated at least three parameters, without customer input.

* * * * *